(12) United States Patent
Pivowar et al.

(10) Patent No.: US 7,707,175 B1
(45) Date of Patent: Apr. 27, 2010

(54) SINGLE ENDED SYNCHRONIZATION AGENTS

(75) Inventors: Alvin I. Pivowar, Camas, WA (US); Jayita Poddar, Sunnyvale, CA (US); Tom Butler, Santa Clara, CA (US)

(73) Assignee: PalmSource Inc., Sunnyvale, CA (US)

( * ) Notice: Subject to any disclaimer, the term of this patent is extended or adjusted under 35 U.S.C. 154(b) by 345 days.

(21) Appl. No.: 10/159,321

(22) Filed: May 31, 2002

Related U.S. Application Data

(60) Provisional application No. 60/377,713, filed on May 2, 2002.

(51) Int. Cl.
*G06F 17/00* (2006.01)
(52) U.S. Cl. .............. 707/610; 707/999.201; 707/999.203; 707/999.204
(58) Field of Classification Search ................ 370/252, 370/260; 707/3, 4, 5, 8, 10, 102, 103 R, 707/104.1, 201, 999.001, 999.1, 999.2, 999.201, 707/999.203, 999.204; 709/203, 204, 208, 709/209
See application file for complete search history.

(56) References Cited

U.S. PATENT DOCUMENTS

| | | | | |
|---|---|---|---|---|
| 5,740,161 A | * | 4/1998 | Porter et al. | 370/260 |
| 6,151,606 A | * | 11/2000 | Mendez | 707/201 |
| 6,721,871 B2 | * | 4/2004 | Piispanen et al. | 712/1 |
| 6,738,789 B2 | * | 5/2004 | Multer et al. | 707/201 |
| 6,757,696 B2 | * | 6/2004 | Multer et al. | 707/201 |
| 6,829,655 B1 | * | 12/2004 | Huang et al. | 709/248 |
| 2003/0212826 A1 | * | 11/2003 | Rapakko et al. | 709/246 |

* cited by examiner

*Primary Examiner*—Fred I Ehichioya
(74) *Attorney, Agent, or Firm*—Berry & Associates P.C.

(57) ABSTRACT

A single ended synchronization agent which communicates with a single endpoint. Responsive to instructions from a synchronization manager, a single ended synchronization agent transfers information between its endpoint and a common synchronization engine. Endpoints may include databases, hand held computers, communication links and the like. These novel single ended agent programs in cooperation with a common synchronization engine are able to synchronize databases. The agent programs need not implement synchronization logic and agent programs are required to understand only a single database. These aspects of the single ended agent programs greatly simplify the design, construction and maintenance of this software when compared with the prior art.

11 Claims, 4 Drawing Sheets

SINGLE ENDED SYNCHRONIZATION AGENTS

RELATED APPLICATION

This Application claims the benefit of U.S. Provisional Application Ser. No. 60/377,713, filed May 2, 2002, entitled "System and Method for Synchronizing Computer Databases," which is hereby incorporated herein by reference in its entirety.

FIELD OF THE INVENTION

Embodiments of the present invention relate to database design. More particularly, embodiments of the present invention provide a method and apparatus for synchronization of computer databases using single ended synchronization software modules called agents.

BACKGROUND ART

A database is generally a collection of related information stored in computer readable form. Databases are ubiquitous in modern life. Mobile phones often contain databases of recently and frequently called numbers. The world wide web is comprised of countless databases. Hand held computers are in large part valuable because of the databases they contain. In fact, the databases contained in most computers are far more valuable than the computer hardware itself.

In order to use this valuable information, people must have access to the information. This is frequently accomplished using different types of computers for different situations. For example, a salesman may create a spreadsheet containing pricing information on a desktop computer, and desire to access that information via a small hand held computer while at a customer's premises.

It is often difficult, expensive or impractical to actually access the same database from both types of computers, especially if one is operated in a mobile environment. To overcome this difficulty, a process of synchronizing the contents of databases was developed.

Synchronizing a database is generally a process by which a plurality of copies of a database is maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows modifications, e.g., additions, deletions and/or changes made to one copy of a database, for example, a copy on a hand held computer, to be reflected to all copies.

Prior art synchronization systems use a "double headed" custom software conduit to synchronize information. As an unfortunate result, such prior art conduits must manage all aspects of synchronization, data retrieval and data storage between two databases, for example on a desktop computer and a hand held computer. Data retrieval and data storage may be particularly difficult in situations involving different types of computers, e.g., hand held versus desktop, which are running different operating systems, e.g., Palm OS versus Microsoft Windows, and which store information in different media, e.g., byte-addressable random access memory versus 512-byte record based rotating magnetic media. In addition, a software conduit designed to synchronize a database on a hand held computer and, for example, a PC must manage the communication between the two computers.

Further, synchronizing data between two database copies is a complex task. Prior art conduits must determine if a difference exists between corresponding records in each copy of a database. In some cases, a record in a first copy may be marked with a "dirty bit" to identify that it has been changed since the last synchronization with a second copy. If the dirty bit is cleared after synchronization with a second copy, and the first copy is subsequently synchronized with a third copy, this method may not identify differences between the first and the third endpoints. As a result, in general prior art conduits must implement multiple methods of identifying and resolving data conflicts between their two copies.

As an unfortunate consequence of these complexities, creating double ended synchronization conduits is beyond the skill level of most practitioners of the software arts, and few hand held applications exploit synchronization as a result. A lack of synchronization conduits limits the usefulness of hand held computers, restricting their many benefits to a mobile workforce.

SUMMARY OF THE INVENTION

Therefore, it would be advantageous to provide a method and system for synchronization of computer databases using single ended synchronization software modules called agents. A further need exists for synchronization agents that may be called multiple times during a synchronization session. A still further need exists for a method and system for synchronizing computer databases between more than one computer.

Embodiments of the present invention provide a method and system for synchronization of computer databases using single ended synchronization agents. Further embodiments provide synchronization agents that may be called multiple times during a synchronization session. Yet other embodiments provide a method and system for synchronizing computer databases between more than one computer.

A single ended synchronization agent program is disclosed. Such a synchronization agent program communicates with a single endpoint. Responsive to instructions from a synchronization manager, a single ended synchronization agent program transfers information between its endpoint and a common synchronization engine. Endpoints may include databases, hand held computers, communication links and the like. These novel single ended agent programs in cooperation with a common synchronization engine are able to synchronize databases. There are numerous advantages of this method over the prior art, including that the agent programs are less complicated than double ended conduits in that the agent programs do not implement synchronization logic and agent programs are required to understand only a single database. These aspects of the single ended agent programs greatly simplify the design, construction and maintenance of this software when compared with the prior art. Such improvements in this field offer greater deployment potential of higher quality synchronization systems than is currently present in the industry.

Another embodiment of the present invention discloses a computer implemented method of synchronizing databases that uses single ended synchronization agents.

Yet another embodiment of the present invention discloses a computer system apparatus for synchronizing information in which a plurality of databases distributed across a plurality of computers may be synchronized using single ended synchronization agents.

DETAILED DESCRIPTION OF THE INVENTION

Figure 1:
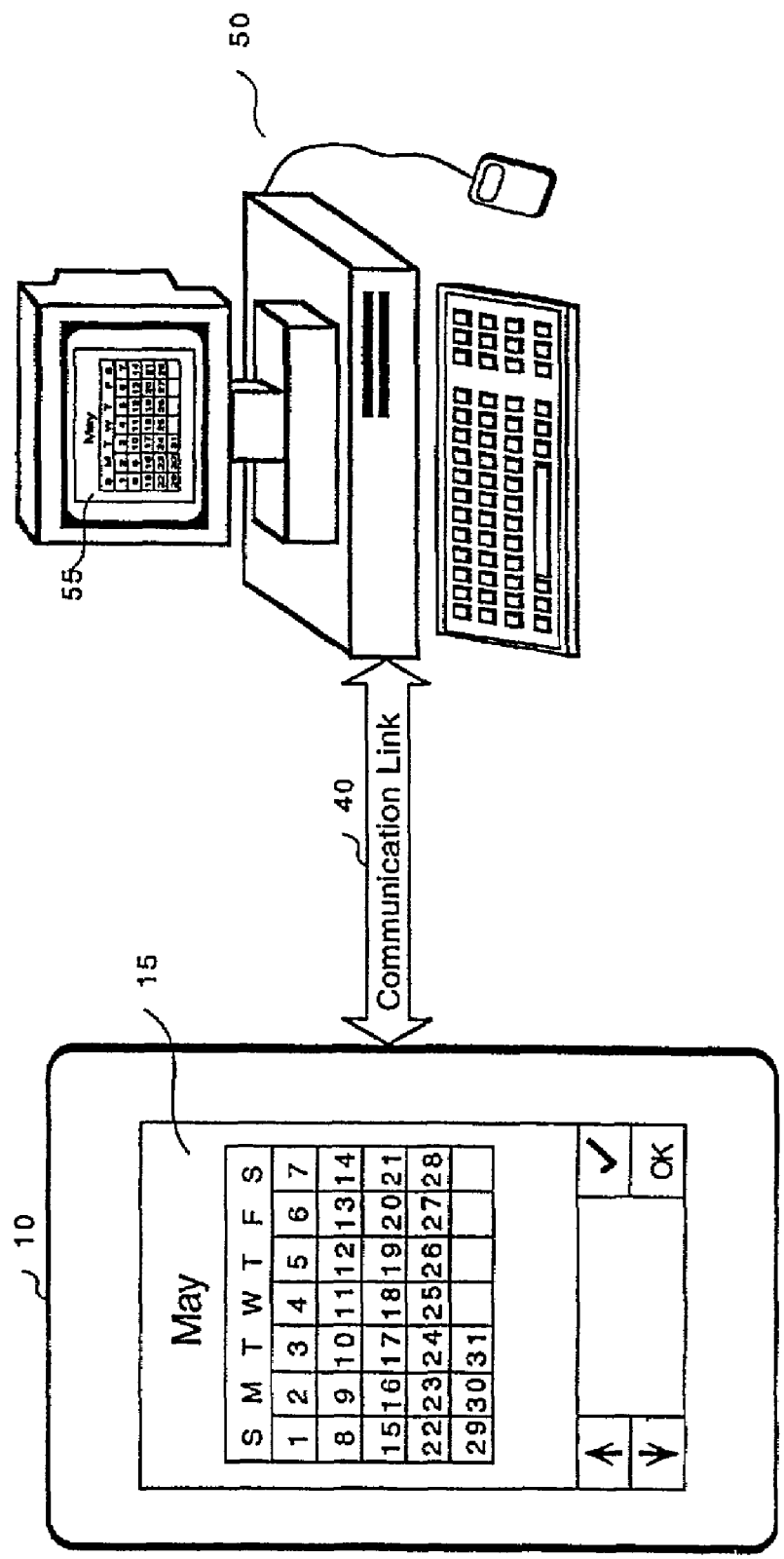
FIG. 1 illustrates a hand held computer system and a desk top computer that maintain synchronized databases, according to an embodiment of the present invention.

In the following detailed description of the present invention, single ended synchronization agents, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 300 and 400) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "demarking" or "transferring" or "synchronizing" or "accessing" or "retrieving" or "conveying" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Single Ended Synchronization Agents

U.S. Pat. No. 6,000,000, issued on Dec. 7, 1999 entitled "Extendible Method and Apparatus for Synchronizing Multiple Files on Two Different Computer Systems" and assigned to the assignee of the present invention is hereby incorporated herein by reference in its entirety as background.

Embodiments of the present invention are described in the context of a hand held computer system interacting with a desktop computer. However, it is appreciated that the present invention may be utilized in other types of computer systems, including embedded and distributed systems, where it may be necessary or desirable to synchronize the contents of computer readable information.

FIG. 1 illustrates a hand held computer system 10 and a desktop computer 50 that maintain synchronized databases, according to an embodiment of the present invention. It is appreciated that a wide variety of databases, resident on a variety of types of computer systems with various interconnections are well suited to embodiments of the present invention. Further, the synchronization of databases within the same computer is well suited to embodiments of the present invention.

Hand held computer system 10 is connected to desktop computer 50 through a communication link 40. Communication link 40 is often an asynchronous serial data link, for example RS-232. However, numerous wired and wireless communication links, including for example, infrared light, Bluetooth, IEEE 802.11 and universal serial bus (USB) are well suited to embodiments of the present invention. Communication link 40 allows the two computer systems to transfer information. In the example of FIG. 1, hand held computer system 10 is running a calendar (or datebook) application program 15 and the desk top computer system 50 is running a complimentary calendar program 55. It is desirable for information entered into one program on one computer system, for example into calendar program 15 running on hand held computer 10, to be shared with another complimentary calendar program, for example calendar program 55 running on desk top computer system 50.

Synchronization is generally a process by which a plurality of copies of a database are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows modifications or updates ("mutations") of information, for example, additions, deletions and/or changes made to one copy of a database, for example a copy on a hand held computer, to be reflected to all copies.

These copies are generally known as "endpoints." In some literature the term "farpoint" is used synonymously. An endpoint is generally a source or destination of records (individual data items) to be synchronized. For example, it is commonplace to synchronize a desktop calendar system database with a calendar database on a hand held computer. In this example, the calendar database on the desktop computer is an endpoint, and the handheld calendar database is another endpoint. Endpoints are generally data structures in permanent, or semi-permanent computer memory, such as battery powered RAM in a hand held computer or magnetic media within a desktop computer. Endpoints may, however, be temporary, for example a buffer in a wireless data protocol stack.

Prior art synchronization systems, including that described in U.S. Pat. No. 6,000,000, use a "double headed" conduit to synchronize information between two endpoints. A double headed or two-ended conduit manages all aspects of synchronization, data retrieval and data storage between two endpoints. In addition, two ended conduits are typically constructed to synchronize between two specific endpoints. For example, a conduit may synchronize between a contact list (phone book) database on a hand held computer and a contact list database on a desktop computer. If an application developer desires to synchronize with a third endpoint, e.g., synchronize the desktop contact list with an email application on the desktop computer (e.g., to share email addresses), under the prior art it would be necessary to construct a new and separate conduit to synchronize these two (second and third) databases (endpoints).

Figure 2:
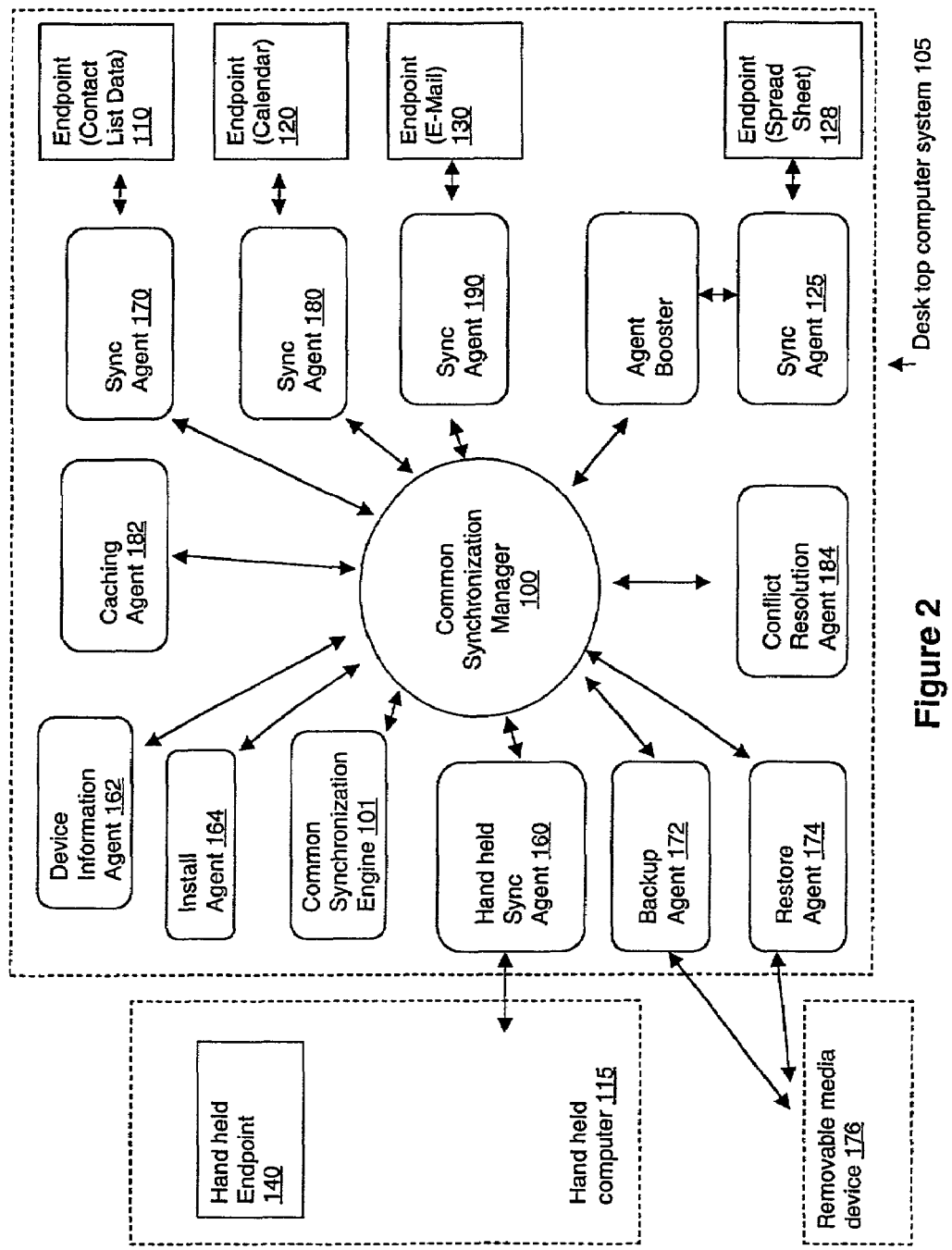
FIG. 2 illustrates a software block diagram of a novel synchronization system with single ended synchronization agents, according to an embodiment of the present invention.

FIG. 2 illustrates a software block diagram of a novel synchronization system with single ended synchronization agent programs, according to an embodiment of the present invention. It is to be appreciated that embodiments of the present invention may have greater or fewer elements of varying types than are illustrated in FIG. 2.

Desktop computer system 105 includes a plurality of synchronization ("sync") agents 125, 170, 180 and 190, a hand held synchronization agent 160, endpoints 110, 120, 128 and 130, and common synchronization manager 100. It is to be appreciated that the terms "agent," "engine" and "manager" as used herein refer to software modules designed to perform actions and methods described herein.

From the perspective of desktop computer system 105, hand held computer 115 comprises a single endpoint 140. It is appreciated that data stored in hand held computer 115 may be in a plurality of separate data structures.

According to an embodiment of the present invention, each synchronization agent communicates with a single endpoint. It is to be appreciated that a synchronization agent may communicate with other software modules, e.g., a synchronization manager software module, which generally do not represent a dataset nor are referred to as endpoints. For example, synchronization agent 170 communicates with endpoint 110, which is a contact list database. Likewise, hand held synchronization agent 160 communicates with hand held computer 115 as a single endpoint 140. It is appreciated that a wide variety of physical transport media are well suited to linking desk top computer system 105 with hand held computer 115, according to an embodiment of the present invention. Links may include, for example, asynchronous serial connections, universal serial bus (USB), ethernet, IEEE 802.11, Bluetooth, telephone lines and wide area wireless connections, e.g., CDPD, Mobitex and the like.

To perform a synchronization of data, for example, contact list data between a contact list database on desk top computer 105 and a phonebook database on hand held computer 115, common synchronization manager 100 is used. Common synchronization manager 100 requests information from synchronization agent 170 and hand held synchronization agent 160. A uniform communication protocol may be used between common synchronization manager 100 and the agents. Synchronization agent 170 accesses endpoint 110 that contains contact list data. Hand held synchronization agent 160 accesses the contact list database on hand held computer 115.

Synchronization agent 170 and hand held synchronization agent 160 provide requested information to common synchronization manager 100 that then provides the information to common synchronization engine 101. Generally on a record by record basis, common synchronization engine 101 will determine if the data in either endpoint, e.g., hand held endpoint 140 or endpoint 110 needs to be updated. If, for example, the contact information in hand held endpoint 140 has been updated, common synchronization engine 101 will send the updates to common synchronization manager 100 for forwarding to synchronization agent 170. Synchronization agent 170 will update the information in endpoint 110.

It is to be appreciated that synchronization may occur between any two or more synchronization agents, and that synchronization does not require hand held computer 115, according to an embodiment of the present invention. For example, an e-mail application may utilize e-mail database 130. Synchronization agent 190 may participate in the synchronization session described above in order to receive any updates to e-mail addresses entered into hand held endpoint 140 or contact list data 110. Alternatively, synchronization agent 190 may participate with synchronization agent 170 in a separate synchronization session and receive updates in this manner.

For example, assume that an e-mail address is changed on hand held computer 115. As previously described, hand held endpoint may synchronize with contact list database 110, via their associated single ended synchronization agents (160, 170) and common synchronization manager 100. At the end of that synchronization session, contact list data 110 is synchronized with the phone book database of hand held computer 115. In a subsequent synchronization session, without the participation of hand held computer 115, e-mail database 130 may be synchronized with contact list database 110. As a result of this second synchronization, e-mail database 130 receives the e-mail address previously updated on hand held computer 115.

It is to be appreciated that a synchronization manager need not be a single module residing on a single computing system, rather it may be distributed into multiple modules on one or more computing systems in accordance with an embodiment of the present invention. One method of distributing a synchronization manager across multiple systems is to use a synchronization manager on one system as an endpoint of a synchronization agent coupled to a sync manager on another system.

There are numerous advantages of a single ended synchronization agent when compared to the prior art. First, a single ended synchronization agent need only "understand" the data formatting and storage requirements of a single database. In contrast, the prior art double ended synchronization conduits were required to implement the data formatting and storage requirements of both databases, which were typically radically different, residing, for example, on different types of computers. Second, the single ended synchronization agent does not perform the critical reconciliation of data that is fundamental to synchronization. A common synchronization engine (e.g., common synchronization engine 101) performs this task. Further, most single ended synchronization software modules will not have to communicate with, or process data on a hand held computer. It is anticipated that manufacturers of hand held computers will provide a synchronization agent for these purposes. Even when there is no initial need to synchronize with other databases, the original developer of an application can facilitate later third-party enhancements by providing an initial (single ended) sync agent. In addition, a desirable feature of single ended synchronization agents is their modularity. As a result of such modularity, new data sources can be added independently, and no two agents access the same data source (endpoint) resulting in simplified change tracking.

With one common synchronization engine, all synchronization and reconciliation logic, including possible multiple methodologies, are common to all synchronization processing. Centralizing this function enables a single group of highly skilled practitioners to develop and maintain this critical software. In the prior art conduits, every conduit developer had to implement all synchronization logic and methodologies, resulting in widely divergent implementations of varying quality. In the prior art these numerous implementations often led to incompatibilities and malfunctions, resulting in poor user experiences and costly service calls. Such disruptions in synchronization may reflect poorly on hand held computer manufacturers, even though their provided hardware and software was not at fault.

A single ended synchronization agent moves data between its associated endpoint and a common synchronization manager. In order to accomplish this task, the synchronization agent is able to perform at least two functions. First, the synchronization agent is able to associate an object within the synchronization engine with a corresponding object in the agent's endpoint, and associate an object within the agent's endpoint with a corresponding object in the synchronization engine. These objects will typically be records of a database, for example contact list information for an individual.

Identification of objects is a rich field in the database arts, and it is to be appreciated that many methods of identifying objects are well suited to embodiments of the present invention. Objects in the synchronization engine may be identified with a global unique identifier, GUID. Objects in the endpoint generally may be identified in an application-independent manner. It may be possible to use the endpoint's identifiers directly as GUIDs, but if the endpoint uses an incompatible system of identification, then a mapping should be maintained by the synchronization infrastructure in order to match corresponding objects. The synchronization engine may provide a persistent GUID mapping applications programming interface, API, for synchronization agents to use.

A second function that is to be performed by a single ended synchronization agent is to deliver to a synchronization engine all data in the endpoint (e.g., database) that has changed since the last time a synchronization engine requested this same type of changed data. It is appreciated that a wide variety of methods may be used to identify objects that have changed in accordance with embodiments of the present invention. For example, one or more "dirty" bits may be set to indicate changes to an object and may be cleared after the object has been synchronized.

A "pedigree" is generally a record of change(s) of a database object, and may be used to indicate if an object has changed since a synchronization session. Co-pending, commonly owned U.S. patent application Ser. No. 10/159,461, filed May 31, 2002 discloses a novel pedigree system that is well suited to embodiments of the present invention, and is hereby incorporated herein by reference in its entirety.

Depending on the pedigree capabilities of the endpoint, at least four classes of synchronization agents are possible. An "ignorant" synchronization agent has no concept of pedigree in its endpoint dataset. It is also unable to determine what data has changed in its endpoint since the last synchronization. An ignorant synchronization agent can only provide the full dataset during a query. A "simple" synchronization agent has no concept of pedigree in its endpoint dataset. It uses a local cache that contains a view of the endpoint dataset at the time of the last sync. A simple synchronization agent uses this cache to determine the delta between the data in the Sync Engine and in its endpoint dataset. It provides this delta during a query. A "normal" synchronization agent uses a simple scheme to indicate a changed record in its endpoint, for example, like a dirty bit. This type of synchronization agent can provide a delta without using a cache, but cannot determine what has changed since an arbitrary sync session. A "smart" synchronization agent uses a rich pedigree scheme in its endpoint dataset and can produce a delta for any sync session.

In order to describe some of the functions and methods used in embodiments of the present invention, the interchange of data between agents during a synchronization session is often modeled as a "tea party." The analogy is extended to include "inviting" synchronization agents to attend the parties. The parties usually have a "theme" which is generally understood to be a description of the type of information being synchronized, for example calendar information. Synchronizing multiple databases will typically involve scheduling multiple parties with differing themes, inviting agents interested in those themes and the like.

In addition to agents that synchronize with common databases, for example a calendar or phonebook databases, there may be a number of more specialized agents participating in a synchronization session. These agents are designed to perform special functions, and generally their endpoints are not accessed by typical application programs. In some cases, prior art implementations of such functions required specialized two-ended conduits and specialized databases or endpoints on at least one side of the conduit. In contrast, as described previously, the present single ended synchronization agents communicate with a single database, for example a special database. Unlike the prior art two ended conduits, such agents are not burdened by the complexities of interacting with a second database.

One such specialized synchronization agent is backup agent 172 of FIG. 2. Such an agent may save data to disks, for example floppy disks or compact discs represented by removable media device 176 of FIG. 2, in a form that is partitionable and restorable. Partitionable implies that each dataset should be backed up to a separate disk file. This is to enable data transfer between users by distributing the file. This file should be restorable for any user.

A second type of specialized synchronization agent is restore agent 174 of FIG. 2. A restore agent can be complimentary to a backup agent.

Another specialized synchronization agent is a "handheld agent," for example hand held synchronization agent 160 of FIG. 2. The hand held agent may participate in multiple synchronization sessions for a variety of types of data. As a participant in various synchronization sessions, the handheld agent moves data from a handheld computer to the synchronization engine, and moves information from the synchronization engine to the hand' held computer. Because the hand held agent synchronizes all of the handheld-based data with the common synchronization manager, most developers of hand held applications may not have to write handheld code when developing single ended synchronization agents. Developers may only need to create code for moving data between the synchronization engine and their endpoint. In contrast, with the prior art double ended conduits, since one endpoint was a hand held database, developers of hand held applications were required to create a complete conduit.

Yet another special synchronization agent is device information agent 162 of FIG. 2. A device information agent collects the (primarily user selectable) preferences and features of the handheld computer so that they may be accessed later. It may store this data in a disk-based persistent store (not shown) on a desktop computer, and allows access to that information through a set of applications programming interfaces, APIs. It is to be appreciated that device information agent 162 communicates with hand held computer 115 through common synchronization manager 100 and hand held synchronization agent 160.

Install agent 164 of FIG. 2 is a specialized single ended synchronization agent to install code and data onto a hand held computer. Programs and the like may be downloaded, for example, from internet websites onto desk top computer system 105, transferred and loaded onto hand held computer 115 via install agent 164. It is to be appreciated that install agent 164 communicates with hand held computer 115 through common synchronization manager 100 and hand held synchronization agent 160.

A novel special type of synchronization agent is a caching agent, for example caching agent 182 of FIG. 2. Such an agent acts as an intermediary between a temporary working memory used by the Synchronization Engine (used for reconciliation during synchronization sessions) and a data structure in long term memory, for example a file on rotating magnetic media (not shown). Saving information to a long-term memory gives persistence to the results of sync parties.

During a synchronization session, all of the agents associated with a data type typically attend that particular synchronization party. However, in practice a number of situations may arise in which all agents associated with a data type are not available. For example, a handheld computer may not be connected to a desktop computer, a central synchronization server may not be online, or a wireless connection may be dropped. Thus, because not all of the endpoints may be present, the corresponding agents may not be able to attend the party. These absent agents are of course not able to process the deltas for the current synchronization session, and later will have to "catch up." The data in the persistent cache allows these "tardy" agents to do just that.

For example, database "S" is maintained on a remote server. Database "D" is maintained on removable media on a desktop computer. Database "H" is maintained on a hand held computer. The hand held computer and the desktop computer may be connected together to synchronize their common databases at a point in time during which the desktop computer is unable to communicate with the server. The desktop computer and the hand held computer complete their synchronization such that database "D" and database "H" are synchronized. At a later time when database "D" has been removed from the desktop computer, the desktop computer and the server are able to communicate. Due to the persistent store and a caching agent, database "S" can be synchronized, even though neither database "D" nor database "H" are available.

The Caching Agent will attend all sync parties whose theme implies the reconciliation of data. The agent will read from the persistent store during the query round and will write out a new file during the report round.

There should also be a way for a set of coordinating agents to request that information from their databases not be cached. This is for agent developers that for security reasons do not want to have a disk-based representation of the data.

A role of a common synchronization engine is to detect and reconcile conflicts, for example records from two or more endpoints that have been modified, such that the reconciliation action will result in a "conflicted" state. Preferably, the conflict should be resolved in the application program that uses the database (e.g., on the handheld computer or on the desktop) since that application is capable of displaying the data to a user. Consequently, identified conflicts may not be resolved during the synchronization session. The resolution may be indefinitely postponed and the conflicted state may be retained.

A specialized conflict resolution agent 184 of FIG. 2 may resolve conflicts according to a set of user-modifiable rules. Such an agent should only resolve conflicts for a dataset when there is no other possibility for resolution.

Another specialized synchronization agent is a "notifier," or notification agent. This agent notifies application programs that "their" data, e.g., data in a database that the application program manipulates, is undergoing synchronization and should not be changed. A notification agent is typically called prior to and after a synchronization session.

It is to be appreciated that many of the typical functions of a synchronization system, e.g., backup, restore, install and application notification, are performed by specialized agents, according to an embodiment of the present invention. Consequently a synchronization system employing the present synchronization agents can be modular and extensible. This capacity differs significantly from the prior art, which generally is not extensible, or relies on a plurality of different mechanisms to achieve similar extensibility.

Figure 3:
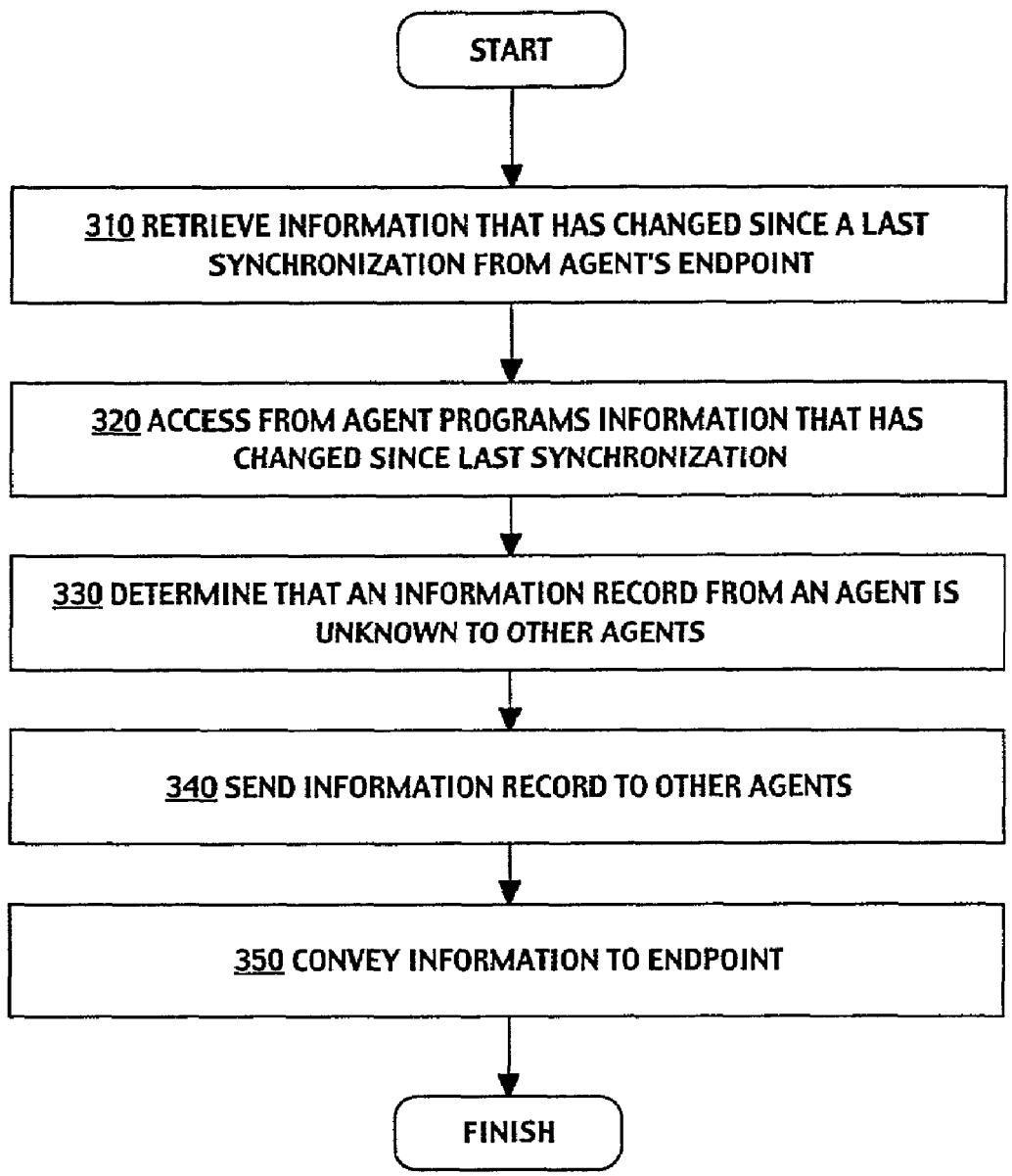
FIG. 3 illustrates a flow chart of a method for a computer implemented method of synchronizing databases, according to an embodiment of the present invention.

FIG. 3 illustrates a flow chart of a method 300 for a computer implemented method of synchronizing databases, according to an embodiment of the present invention.

In optional step 310, an agent program retrieves information from its database that has changed since a last synchronization session.

In step 320 a synchronization engine program accesses information that has changed since a last synchronization session from a plurality of agent programs.

In step 330 a synchronization engine program determines that an information record from one of the agent programs is unknown to another of the agent programs.

In step 340 a synchronization engine program sends the unknown information to the unknowing agent program. Optionally, a synchronization engine program may detect that two or more agents have modified, non-equivalent information for the same record that is unknown to other agents. In this situation, the synchronization engine program may identify such information records as being in conflict prior to providing the new records to all (other than the providing) agents.

In optional step 350, an agent program conveys the (new) information to its endpoint.

In this novel manner, single ended agent programs in cooperation with a common synchronization engine and manager are able to synchronize databases. There are numerous advantages of this method over the prior art, including that the agent programs do not implement synchronization logic and agent programs are required to understand only a single database. These aspects of the novel single ended agent programs greatly simplify the design, construction and maintenance of this software when compared with the prior art. Such improvements in this field may result in greater deployment of higher quality synchronization systems than is currently present in the industry.

In order to more fully describe aspects of the present invention, portions of the application programming interface used by single ended synchronization agents are hereby provided. More specifically, a set of software functions that perform various synchronization tasks are defined. Also explained are some of the structures and parameters needed to correctly call these functions. It is appreciated that other implementations of such functions are well suited to embodiments of the present invention.

According to an embodiment of the present invention, single ended synchronization agents define an interface with a Synchronization Manager ("Sync Manager") and a Synchronization Engine. A Synchronization Manager uses this interface to coordinate, or schedule a synchronization session.

The interface can be viewed as notifications sent by the Synchronization Manager to the agent, however each of these notifications is accomplished by calling a corresponding entry point within the agent. The Synchronization Engine reconciles the data using an internal memory-based cache.

Preferably, the interfaces use handles to access data structures. APIs provide access information given a handle to that data structure. This method abstracts the data in a language-independent manner.

Agents are dynamically loaded by the Sync Manager and are executed by calling into their entry points. Note the difference between a synchronization agent as a dynamically loadable module, and an instance of that module during execution. There is typically only one copy of a particular Agent on the desktop computer, and that copy (the module) is loaded by the Sync Manager. During a synchronization session however, instances of a particular agent may execute many times. For example, an Agent Module may wish to attend multiple synchronization parties, and thus an instance of that Agent will be run for each session. It is also possible to have multiple instances of the same Agent Module attend the same party. This is recommended for Agents whose far point is a standards-based protocol that may be used by different applications. The following two entry points are called by the Sync Manager to interrogate an Agent Module to determine the number of instances and the synchronization sessions they attend.

AgentModuleGetInfo( )

This entry point is called by the Sync Manager to get global information relating to the Agent Module. This information is its unique ID, its persistence, and its version.

AgentGetInfo( )

This entry point is called by the Sync Manager to get instance-specific information from the Agent Module. Each time the Sync Manager calls this entry point, the Agent Module returns information about a specific instance of the Agent. This information includes a unique instance ID, a displayable instance name, and the theme where this Agent may attend.

SyncSessionBegin( )

This entry point is called by the Synchronization Manager after a request is made to begin a synchronization party.

SyncSessionPreSync( )

This entry point is called by the Sync Manager after SyncSessionBegin( ) has completed and before any themes are placed on the scheduling queue.

SyncPartyInvite( )

This entry point is called by the Sync Manager when it processes the next theme on the queue. Each agent is called and allowed to state whether or not they will attend the specific synchronization session (party).

SyncPartyBegin( )

Each agent that has indicated that it will attend a sync session is called. This entry point is called before any syncing is done.

SyncPartyAgenda( )

Each agent in the sync session is asked for its level of expertise and its area of interest. A level of expertise is the set of data questions an agent can answer. Later (SyncPartyQuery( )), the Sync Manager may ask this agent these questions. "Area of interest" is the set of data questions the agent requires an answer to. Later (SyncPartyReport( )), the Sync Manager may present the agent a set of answers.

SyncPartyQuery( )

During the agenda round agents indicated what questions they can answer. Agents also stated what information they require. For each question and answer correspondence, an appropriate agent is called and asked a set of questions it can answer. The synchronization manager gives the agent's answers to the synchronization engine. The synchronization engine uses the answers to compute the set of questions that remain to be answered. The questions then become the new agenda. The synchronization manager then poses these questions to the next agent capable of answering them.

SyncPartyReport( )

For each agent that asked a question, the report entry point is called with the answer.

SyncPartyEnd( )

This entry point is called into each agent attending a sync session when all of the synchronization rounds are finished.

SyncSessionPostSync( )

This entry point is called by the Sync Manager when all of the themes in the queue have been processed. Every agent is called.

SyncSessionEnd( )

This entry point is called by Sync Manager after all of the post sync processing has completed. All agents are called.

SyncSessionCancel( )

This entry point is called if the synchronization session terminates abnormally and one of the agents is currently processing a notification. Only that agent's entry point will be called.

During a synchronization session the synchronization engine will call the agents to inform them as to the state of the synchronization session and to give the agents an opportunity to direct and participate in synchronization parties.

A "theme handle" is a handle (name) to the synchronization theme, or type of data being synchronized. This is an abstract data structure maintained by the Sync Manager. The agent can use a set of "Theme APIs" to access information about the theme.

There are two contexts in which themes are presented. The first is when an application makes a call into the Sync Manager to initiate a synchronization session. That application will pass in a theme. The theme indicates why the sync is being initiated, e.g., it could be a sync for a specific database (creator ID) or a manufacturer-defined theme created to handle special synchronization sessions. The theme is the theme of the entire synchronization session.

The other context in which a theme is presented is during the synchronization parties. In this context, the theme defines the purpose of the party. The theme for a party context is only valid for the duration of the party.

"Synchronization Context" is an abstract data structure maintained by the Sync Manager. The Sync Context encapsulates state information that enables information sharing and re-entrancy. The Sync Context may be seen as a set of environments that contain attributes defined as (keyword, value) pairs.

In general, there are three primary data environments (e.g., spans of data access) associated with synchronization, according to an embodiment of the present invention. These data environments are "session," "theme," and "agent." The session environment is shared by all agents and any keyword contained in that environment is available to any agent throughout the entire synchronization session. The theme environment is shared by all agents that are participating in the sync party for that theme. Keywords in the theme environment are no longer valid after the conclusion of that sync party. The agent context provides a "private" space for each agent. These keywords are persistent throughout the entire synchronization session.

AgentModuleInfo

This data structure is used to pass Agent Module information from the Agent Module to the Sync Manager. It is used during the AgentModuleGetInfo( ) call.
typedef struct AgentModuleInfoTag {
GUID id;
Uint16 persistence; //Should be a typed enum
_TCHAR version[kAgentModuleVersionSize];
} AgentModuleInfo;

AgentInfo

This data structure is used to pass Agent Instance information from the Agent Module to the Sync Manager. Each time the Sync Manager calls the Agent Module this data structure is used. Each use of the data structure corresponds to information regarding a single Agent Instance.
typedef struct AgentInfoTag {
Uint16 agentId; //Agent assigned; must be unique within a module
_TCHAR agentName[kAgentNameSize];
_TCHAR partyTheme[kThemeNameSize];
} AgentInfo;

AgentModuleGetInfo( )

The Sync Manager calls the Agent Module to obtain module-specific information. The Sync Manager calls this entry point in the Agent Module once, when it is loaded for the first time. This call is independent of synchronization sessions.

AgentGetInfo( )

The Sync Manager calls the Agent Module to obtain instance-specific information. When a parameter is true (non-zero), the Sync Manager will call this entry point again, in order to get information about the next Agent Instance. When there are no more instances to talk about, the Agent Module sets this to false (zero.) Note that in most cases, there is only a single Agent Instance per Agent Module. The Sync Manager presets this parameter to false (zero), so an Agent Module need not modify it except in the case that there are additional instances.

SyncSessionBegin( )

This is the first notification sent out by the Sync Manager. It is an indication that a synchronization session is about to start. The Sync Manager sends this notification to every agent once per synchronization session. Agents can use this notification to decide if the sync should begin for the given user. An agent can choose to cancel or abort the sync by calling the Sync Manager's cancel function.

SyncSessionPreSync( )

This notification is sent before the Sync Manager starts any sync parties. It provides an opportunity for agents to perform any initialization. The Sync Manager sends this notification to every agent once per synchronization session. Agents can use this notification to perform any initialization (before sync parties start). The Device Info Agent collects updated device information at this time.

SyncSessionPostSync( )

This notification is sent after all sync parties have been completed. It provides an opportunity for agents to perform any clean up. The Sync Manager sends this notification to every agent once per synchronization session. Agents can use this notification to perform any clean up activity (after all sync parties have completed). This is an opportunity for backup agents to backup databases and files to the desktop. Device administration or inventory-type agents can also collect device information at this time. The Device Info Agent could also collect updated device information at this time.

SyncSessionEnd( )

This notification is sent by the Sync Manager to indicate that the sync session for the specified user is about to terminate. Parameters are either an enumerated type or a string indicating the reason that the sync was cancelled.

If this is a string it should be possible to localize it. The Sync Manager sends this notification to every agent once per sync session.

SyncSessionCancel( )

This notification is sent asynchronously by the Sync Manager to indicate that the sync session has been cancelled. This API may have two parameters. A "state" is the state of the sync when it was cancelled. It may also indicate which agent cancelled the synchronization session. A "reason" is either an enumerated type or a string indicating the reason that the synchronization session was cancelled. If this is a string it should be possible to localize it.

SyncPartyInvite( )

This notification is called by the Sync Manager when processing the next theme on the queue. Every agent is called and given the opportunity to join or refuse the sync party invitation. The parameter is answer for the invitation. An agent sets this Boolean to true if attending the sync party, false otherwise. Not setting the parameter is equivalent of setting it to false.

SyncPartyBegin( )

This notification is sent by the Sync Manager after the set of participating agents is known, but before any data processing has occurred. This allows the agents to perform initialization.

SyncPartyAgenda( )

This notification is sent by the Sync Manger to all of the agents in the currently scheduled sync party (one theme). Each agent directs the sync by presenting set of questions (the query) that it needs other agents to answer, referred to as the agent's agenda, and a set of questions that it can answer for other agents, referred to as the agent's expertise. A first parameter of this call is "query expertise." This parameter is an abstract data structure that contains a set of (creator Id, database names, category Id) triples that defines either a question or answer. A second parameter is "round." This is the round number. The synchronization component of a sync party (agenda, query, report) may occur several times. This allows agents to order synchronization in the case of data dependencies.

SyncPartyQuery( )

The Sync Manager calls this notification to ask questions of an agent in the sync party. These are questions from other agents that fall into the current agent's expertise. There are generally three parameters to this call, query, answer and round.

A query is an abstract data structure that contains a (creator Id, database names, category Id) triple that defines a question.

Answers are an abstract data type that contains the answer to the question. Answers are in the form of a set of data records that match the attributes of the question and are records which are new, changed, or deleted since the last time this question was asked. The round parameter is the round number. The synchronization component of a sync party (agenda, query, report) may occur several times. This allows agents to order synchronization in the case of data dependencies.

SyncPartyReport( )

This notification is called by the Sync Manager to present the answers to an agent that it asked during the agenda round. The three parameters are answer, round and repeat. The answer parameter is the answer to the question. The round parameter is the current round number. If the "repeat" parameter is left alone or set to false, no subsequent sync round will occur. If set to true, an additional sync round will follow. If any agent in the sync party requests an additional round, all agents will participate in the new round.

SyncPartyEnd( )

This notification is called by the Synchronization Manager after all of the synchronization rounds are completed for a sync party (one theme). Each agent in the synchronization session (party) is called. This allows any agents to perform clean up. This notification contains a single parameter, "reason." "Reason" is either an enumerated type or a string indicating the reason that the sync was cancelled. If this is a string it should be possible to localize it.

There may be at least three entry points to an agent, namely "agenda," "query" and "update." According to an embodiment of the present invention, these entry points correspond to "rounds" or phases of a synchronization process.

These three rounds allow an agent to provide and/or receive synchronization information. In the agenda round, an agent inquires of a common synchronization manager for updates to the agent's database. In addition, the agent identifies the database that it represents, and provides information as to the level of information that the database contains. Likewise, the agent also informs the common synchronization manager of the agent's "expertise," for example the information contained within the database. It is frequently the case that the inquiry and expertise contain the same information. For example, a database may generally be able to provide information to a certain level, and request any updates beyond that level. It is to be appreciated, however, that the inquiry and expertise may not contain the same information. For example, an agent representing a database contained on read only media (e.g., a CD-ROM), may describe expertise while making no inquiries, since its database is incapable of storing new information. A data logging agent, for example a program used to make a permanent copy of financial transactions, may appear as "write-only" memory. Such an agent might inquire, e.g., for all information, and profess no expertise.

Figure 4:
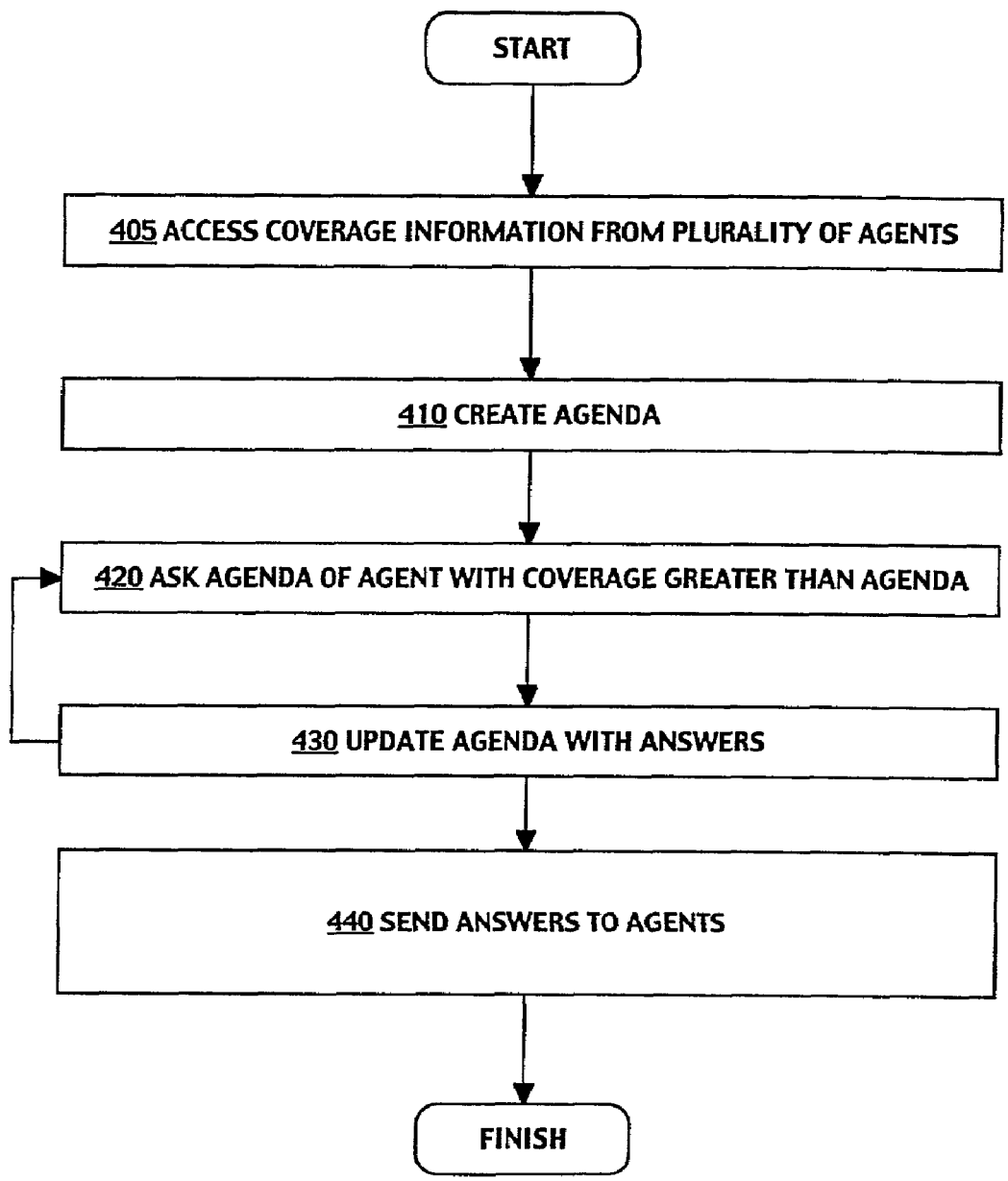
FIG. 4 is a flow chart illustrating a method of synchronizing databases using single ended synchronization agents, according to an embodiment of the present invention.

FIG. 4 is a flow chart illustrating a method 400 of synchronizing databases using single ended synchronization agents, according to an embodiment of the present invention.

In step 405, a common synchronization engine, for example common synchronization engine 101 of FIG. 2, accesses information from a plurality of synchronization agents (access may occur through a common synchronization manager), for example sync agents 160 through 190 of FIG. 2, describing the information present in associated databases. As described previously, the information present is denoted by an agenda and an expertise. In many cases, the agenda is simply the compliment of the expertise. The expertise indicates what is known, while the agenda indicates what is not known. Consequently, it is often possible to represent both agenda and expertise by placing a different interpretation on the same information.

One method of describing the level of data in a database is by "coverage." Co-pending, commonly owned U.S. patent application Ser. No. 10/159,462 filed May 31, 2002 entitled "Fast Synchronization of Computer Databases Using Coverage Status" discloses a novel system of coverage that is well suited to embodiments of the present invention, and is hereby incorporated herein by reference in its entirety. It is to be appreciated that other methods of maintaining and describing the level of information in a database are well suited to embodiments of the present invention. Co-pending commonly-owned U.S. patent application Ser. No. 09/710,605, filed Nov. 10, 2000 entitled "Optimized Database Technique to Enable Faster Data Synchronization" to McCaw is hereby incorporated herein by reference in its entirety. U.S. Pat. No. 6,000,000 and U.S. patent application Ser. No. 09/710,605 describe additional methods of maintaining and describing the level of information in a database.

In step 410, a common synchronization engine forms an agenda that encapsulates all of the questions asked by the agents. This "party agenda" is typically the greatest lower bound (or floor) of the coverages received from the agents. In step 420, the common synchronization engine asks the agenda (questions) of an agent with coverage greater than the agenda. It is appreciated that a synchronization manager may ask the questions and/or identify which agent to ask, on behalf of the synchronization engine, according to an embodiment of the present invention.

In step 430, the common synchronization engine receives answers to at least some of the agenda questions, and updates the agenda, e.g., eliminates some questions, based on the answers received. It is to be appreciated that the answers to the agenda represent information (data records) that were unknown to at least one other agent. Optionally, process flow may continue at step 420, for example if all questions have not been answered.

In step 440, answers are sent to agents, and the corresponding databases are consequently updated and synchronized with the other databases participating in the synchronization. It is appreciated that a synchronization manager may send the answers and/or identify which agent to received a particular answer, on behalf of the synchronization engine, according to an embodiment of the present invention.

The preferred embodiment of the present invention, single ended synchronization agents, is thus described. While the present invention has been described in particular embodiments, it should be appreciated that the present invention should not be construed as limited by such embodiments, but rather construed according to the below claims.

What is claimed is:

1. A system of information transfer for synchronizing information between a plurality of endpoints comprising:

one or more computing systems having at least one memory coupled to at least one computing system, said memory configured to store a plurality of single ended synchronization agents, each agent including a module tailored to interact with and to extract update information from a specific first endpoint database wherein at least one of said single ended synchronization agents incorporates pedigree capabilities to record endpoint changes;

one or more processors coupled to said one or more computing systems, said one or more processors configured to implement a first synchronization manager for controlling the plurality of single ended synchronizing agents wherein said first synchronization manager is distributed into multiple modules of one or more computing systems by using a synchronization manager on a first computing system as an endpoint of a synchronization agent coupled to a second synchronization manager on another computing system and wherein said synchronization manager functions as a notification agent to notify of synchronization;

said one or more processors configured to implement a common synchronizing engine coupled to the synchronization manager for reconciliation of transferred information; and a communication link adapted to communicate data between the first endpoint database and a second endpoint database, wherein within the transfer, the plurality of single ended synchronization agents return update information to the synchronization engine via the synchronization manager, and the synchronization engine provides reconciliation between the first endpoint database and the second endpoint database.

2. A system according to claim 1 wherein a single ended synchronization agent may be called multiple times during a single synchronization session.

3. A system according to claim 1 wherein databases are synchronized between a plurality of computing systems.

4. A system according to claim 3 further including a computing system in the form of a handheld computer having a database.

5. A system according to claim 3 further including a computing system having multiple databases for synchronization.

6. A system according to claim 1 further including a computing system and wherein said communication link comprises an asynchronous serial data link.

7. A system according to claim 1 further including a computing system and wherein said synchronizing engine comprises one common synchronization engine.

8. A system according to claim 1 further including a computing system wherein at least one of said synchronization modules associates corresponding objects in said synchronization engine and endpoints.

9. A system according to claim 1 further including a computing system wherein said synchronizing engine includes a coaching agent for writing new files.

10. A system according to claim 1 further including a computing system further including a conflict resolution agent for resolving data conflicts.

11. A system according to claim 1 further including a computing system wherein the operation of the communication link defines interfaces with said synchronizing manager and said synchronizing engine.

* * * * *